Figure 1:
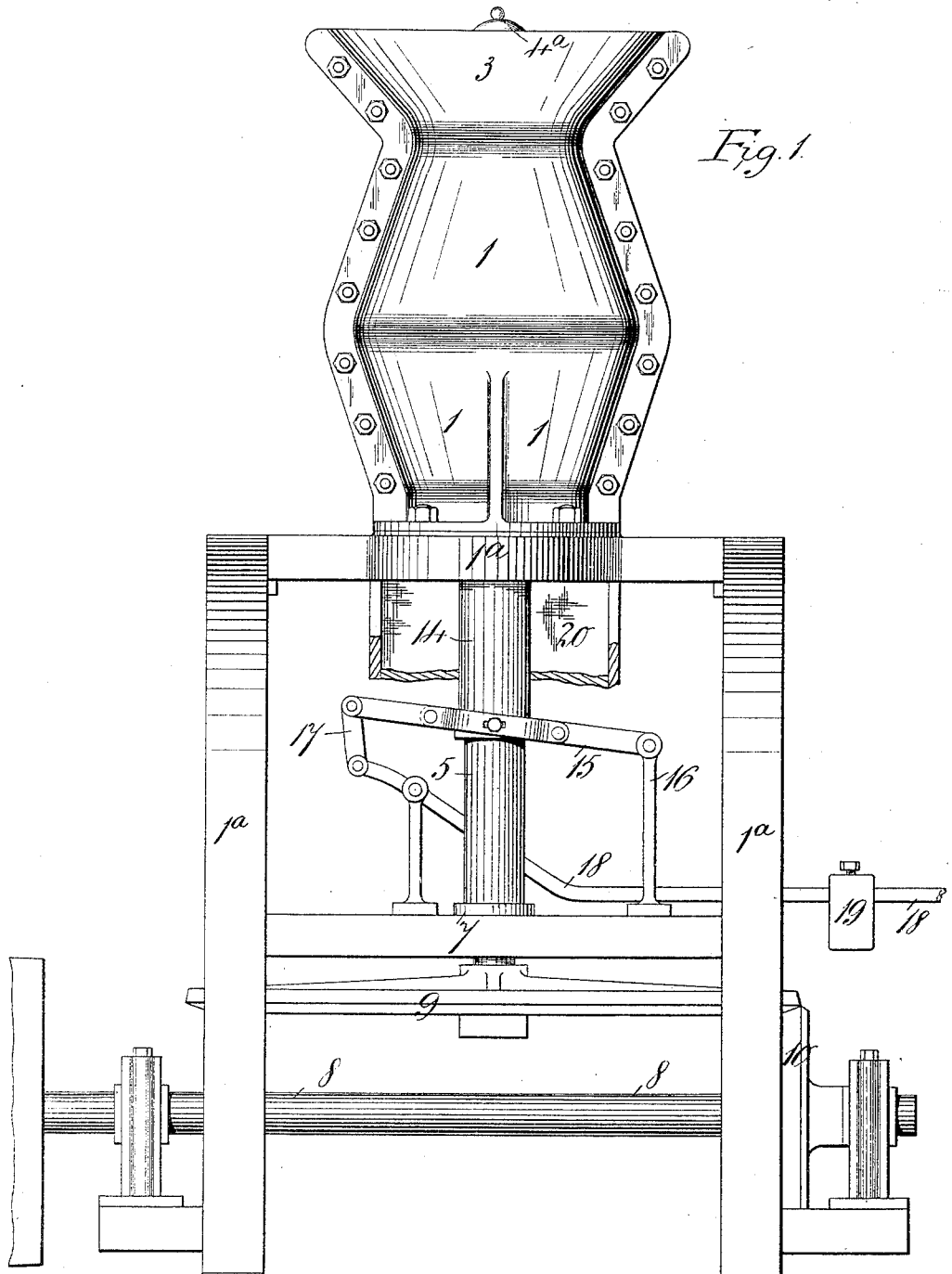

(No Model.) 5 Sheets—Sheet 1.

W. A. DIESELDORFF.
COFFEE HULLER AND POLISHER.

No. 439,485. Patented Oct. 28, 1890.

Witnesses
W. Cross
H. J. Bringham

Inventor
W. A. Dieseldorff (No Model.) 5 Sheets—Sheet 4.

W. A. DIESELDORFF.
COFFEE HULLER AND POLISHER.

No. 439,485. Patented Oct. 28, 1890

Witnesses
W. Cross
F. J. Bingham

Inventor:
W. A. Dieseldorff

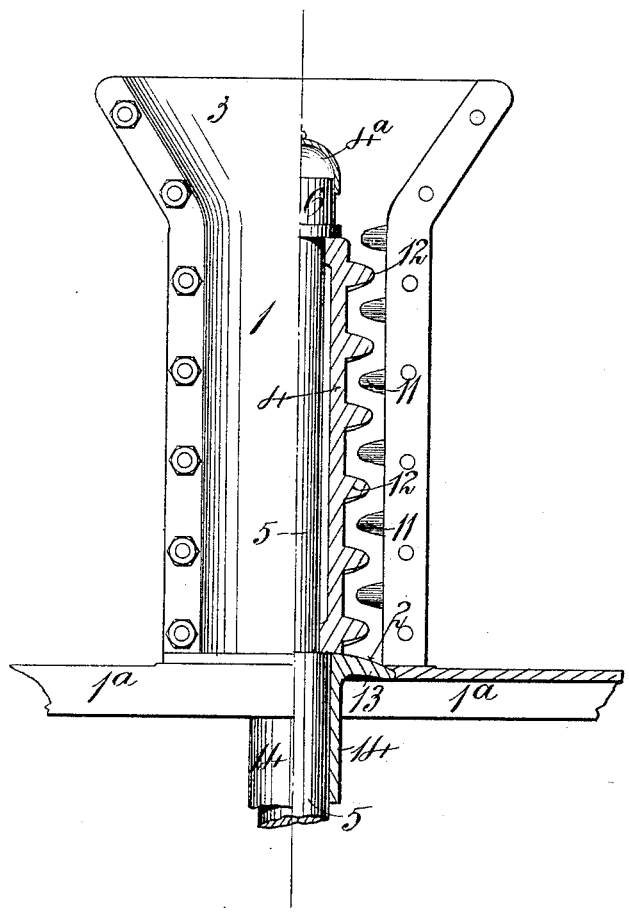

UNITED STATES PATENT OFFICE.

WILLIAM ANTHONY DIESELDORFF, OF LONDON, ENGLAND.

COFFEE HULLER AND POLISHER.

SPECIFICATION forming part of Letters Patent No. 439,485, dated October 28, 1890.

Application filed November 8, 1889. Serial No. 329,604. (No model.)

*To all whom it may concern:*

Be it known that I, WILLIAM ANTHONY DIESELDORFF, a subject of the German Emperor, residing at Forest Hill, in the county of Surrey, Kingdom of Great Britain and Ireland, have invented Improvements in Coffee Hullers and Polishers, of which the following is a specification.

This invention relates to improvements in coffee hullers or machines for removing the husk from coffee-berries. Machines have heretofore been constructed for this purpose in which the hulling-chamber and the rotary cone or stirrer therein have each been provided with ribs or projections forming continuous screw-threads having a rapidly-increasing pitch as they proceeded downward. There are several objections to such machines. Among these the following may be mentioned: They discharge the hulled berries at one side of the hulling-chamber, which consequently cannot be automatically or readily emptied of the whole of the berries treated, and the dust therefrom accumulates in the hulling-chamber and causes the color or appearance of the coffee-berries to be injuriously affected; considerable power is absorbed in causing the necessary movement of the berries among themselves to effect the hulling operation, and the berries are subjected to unequal pressure at different parts of the hulling-chamber and discharge-passage, and are thereby heated and sometimes broken or damaged.

Now, the object of my invention is to obviate the foregoing disadvantages. For this purpose the hulling-chamber and the rotary mixing-cone or stirrer therein are each formed or provided with a series of short projections, those on the inner side of the hulling-chamber being arranged in horizontal annular rows, as also are those on the rotary cone or stirrer; but these are inclined and so arranged as to act after the manner of a series of interrupted screw-threads of equal pitch, the parts of which are at such a distance apart vertically as to pass freely between the projections fixed to the hulling-chamber without danger of crushing or damaging the coffee-berries treated. The hulling-chamber is provided at its bottom with a vertically-movable closure that may advantageously be of conical form and is carried by a counterbalanced lever. The cone or stirrer may be rotated by any suitable means—such, for example, as bevel-gearing. The hulling-chamber and rotary cone or stirrer may be of various forms. Good results may be obtained with the hulling-chamber and stirrer each in the form of two truncated cones placed base to base, or with a chamber in the form of a cylinder provided with projections, as before, the inner cone or stirrer being of corresponding shape and arranged to insure an equal distance all round between the two.

Figure 2:
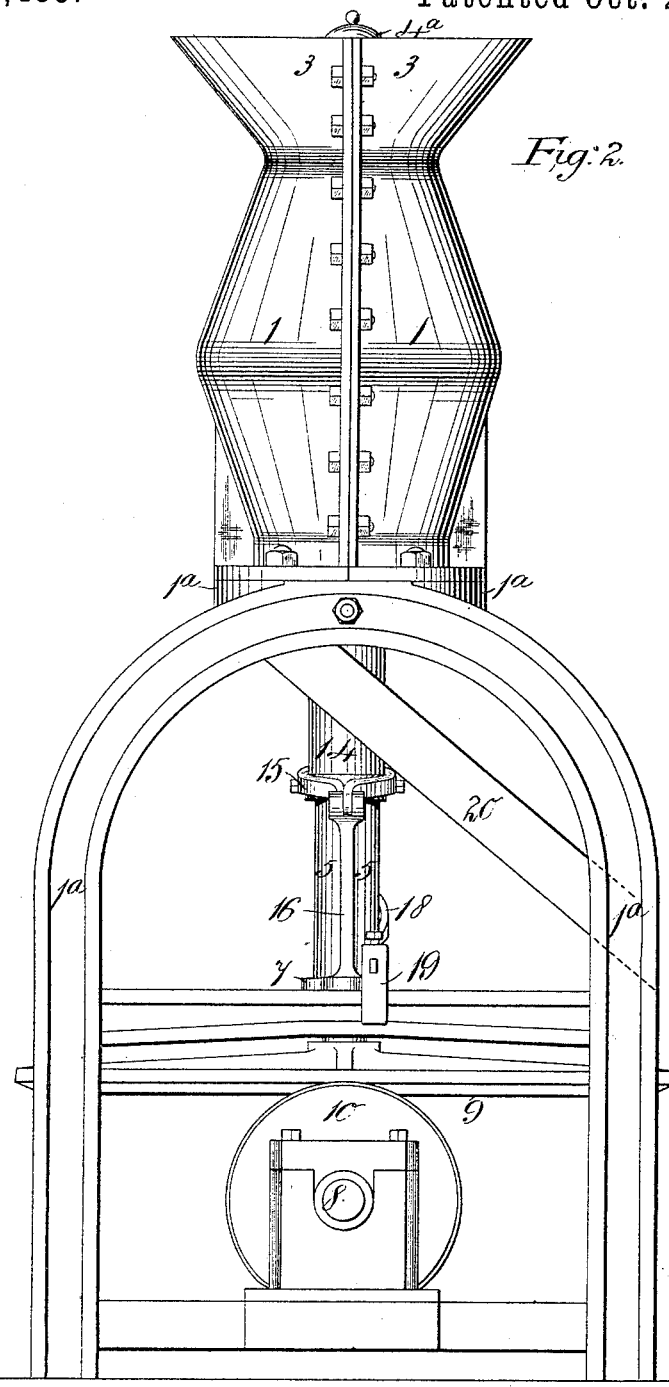
Figure 3:
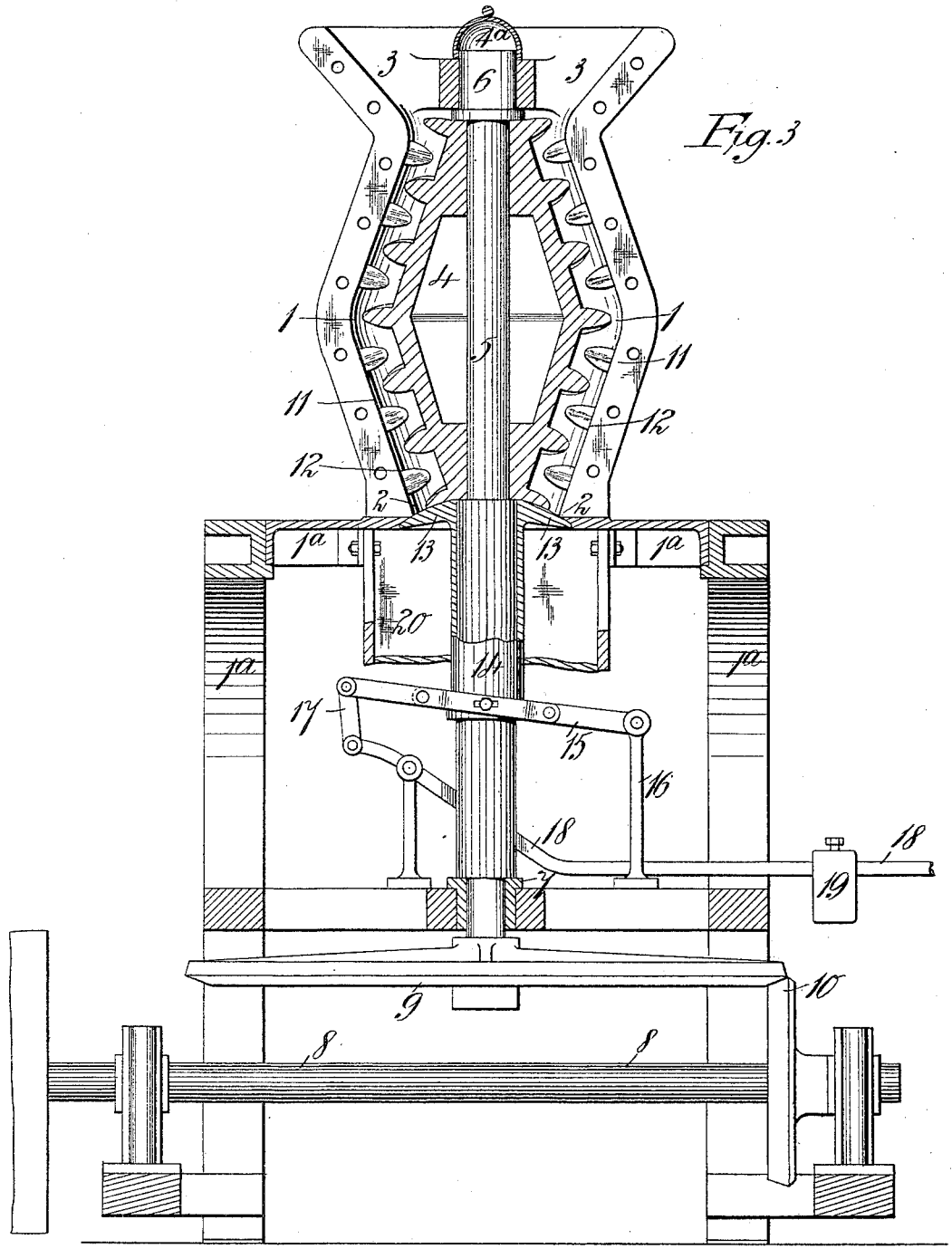
Figure 4:
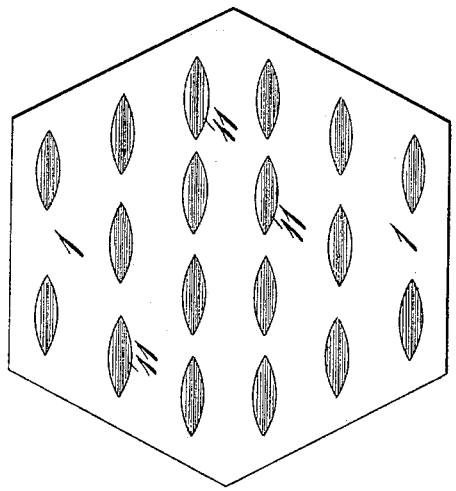
Figure 6:
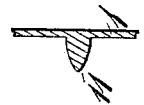
Figure 7:
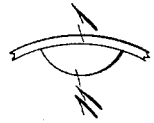
Figure 5:
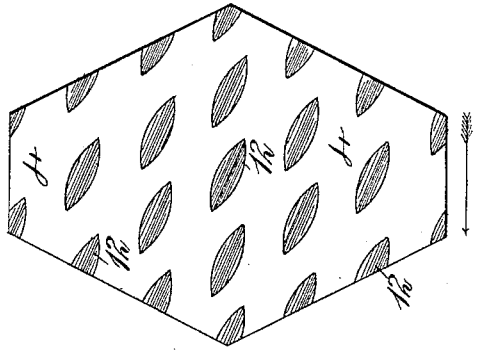

In the accompanying drawings, Figures 1 and 2 are elevations at right angles to each other of a coffee huller and polisher according to this invention. Fig. 3 is a similar view to Fig. 1, but with one-half of the hulling-chamber removed and the rotary stirrer in vertical section. Figs. 4 and 5 are developed views of one-half of the hulling-chamber and stirrer, respectively. Figs. 6 and 7 are sectional detail views of one of the projections on the hulling-chamber. Fig. 8 is a vertical section illustrating a modified form of hulling-chamber and rotary stirrer.

Referring to Figs. 1 to 7, inclusive, 1 is a hulling-chamber having a discharge-opening 2 at its bottom and a conical hopper 3 at its top. This hulling-chamber, which in the example shown is in the form of two hollow truncated cones placed base to base, is with its hopper 3 made in two parts, bolted together, as shown, and supported by a frame 1ª. 4 is a rotary stirrer arranged centrally within the hulling-chamber, with which it corresponds in shape. This stirrer is fixed upon a vertical driving-shaft 5, that works in bearings 6 and 7 and receives motion from a main horizontal driving-shaft 8 through bevel-wheels 9 and 10, fixed upon the shafts 8 and 5, respectively. By constructing the hulling-chamber in two parts, as shown, access can be readily gained to its interior and to the rotary stirrer without interference with the driving mechanism.

4ª is a cap fitting tightly on the bush constituting the bearing 6. It serves to prevent the entrance of dirt to the bearing-surfaces at this part. The hulling-chamber 1 is provided on its inner side with a series of projections 11, arranged in horizontal annular rows, as shown more clearly in the developed view, Fig. 4. These projections are each placed at right angles to the inner surface of the hulling-chamber and extend in a horizontal direction. The rotary stirrer 4 is also provided with horizontal annular rows of projections 12, with each projection arranged at right angles to the surface of the stirrer; but these projections are inclined or extend downward, as shown, after the manner of parts of screw-threads. These projections 12 are equally inclined or of equal pitch, as shown, so that when the stirrer is rotated in the direction of the arrow, Fig. 5, coffee-berries within the hulling-chamber will be subjected to pressure that will be equal all around the stirrer and hulling-chamber.

The inclined projections 12 are, as hereinbefore mentioned, at such a distance apart vertically as to permit of the free passage between them of the horizontal projections 11 without danger of crushing or damaging the coffee-berries treated.

13 is a vertically-movable bottom or closure of conoidal form adapted to close the circular opening 2 at the bottom of the hulling-chamber, but which when opened, as hereinafter described, permits of the continuous discharge of hulled berries and husk all around the bottom of the hulling-chamber. This closure has connected thereto a sleeve 14, that is capable of sliding upon the shaft 5 and guiding the closure vertically when the same is moved. The sleeve has jointed thereto by a pin-and-slot connection a lever 15, that is jointed at one end to a fixed support 16, and at the other end is connected by a link 17 to one end of a bent lever 18, the other end of which carries an adjustable weight 19. This weight is so adjusted that the closure 13 will be raised in an automatic manner into a position to close the bottom of the hulling-chamber when the machine is at rest, with no coffee-berries in such chamber, but will permit the closure to move downward, so as to open the bottom of the hulling-chamber when the machine is in operation by the action on such closure of the berries, which will consequently be all subjected to an approximately equal pressure while within the hulling-chamber. By adjusting the position of the weight 19 the pressure to which the berries are subjected can be varied as desired.

With the construction described and shown when the rotary stirrer is rotated in the direction of the arrow, Fig. 5, and coffee-berries to be hulled are fed into the hulling-chamber, these berries will be compressed by the inclined projections 12, and will be caused to move in contact with one another with sufficient friction to effect the hulling and polishing of the berries in a rapid and efficient manner.

The horizontal projections 11 serve to prevent the berries being carried bodily around the hulling-chamber by the projections 12.

The coffee-berries while being hulled are constantly pressed downward by the inclined projections 12 on the cone or stirrer 4, the hulled berries and husk therefrom pressing on the movable bottom or closure 13 with sufficient force to open it in an automatic manner against the action of the weighted lever 18, and allow of the continuous circumferential discharge of the berries, with all the refuse and dust produced during the hulling operation, through the bottom of the hulling-chamber onto a suitable chute or conveyer 20.

When the machine comes to rest, the bottom or closure 13 will rise and prevent further escape of berries from the hulling-chamber.

The hulling-chamber 1 and rotary stirrer 4, instead of being of conical form, as shown in Figs. 1 to 5, can each be of cylindrical form, as shown in Fig. 8, which shows, partly in elevation and partly in vertical section, such a chamber and stirrer.

What I claim is—

1. A coffee huller and polisher comprising a hulling-chamber having a circular discharge-opening at its bottom and a rotary stirrer 4, each having a truncated conical lower end, said hulling-chamber having horizontal annular rows of projections 11, and said stirrer having horizontal annular rows of inclined projections 12, arranged after the manner of interrupted screw-threads, a vertical shaft 4, and means, substantially as described, for rotating said stirrer, a movable circular bottom or closure 13, arranged below the discharge-opening of said hulling-chamber, and means, substantially as described, for carrying and operating said bottom or closure, as set forth.

2. A coffee huller and polisher comprising a hulling-chamber 1, having a discharge-opening at its bottom and a rotary stirrer 4, each in the form of two truncated cones placed base to base, said hulling-chamber having horizontal annular rows of projections 11, and said stirrer having horizontal annular rows of inclined projections 12, a vertical shaft 5, and means, substantially as described, for rotating said stirrer, a movable bottom or closure 13, arranged below the discharge-opening of said hulling-chamber, and means, substantially as described, for carrying and operating said bottom or closure, as set forth.

In testimony whereof I have signed my name to this specification in the presence of two subscribing witnesses.

WILLIAM ANTHONY DIESELDORFF.

Witnesses:
    WM. R. FROST,
46 *Lincoln's Inn Fields, London, W. C.*
    JOHN D. VENN,
9 *Gracechurch Street, London, E. C.*